3,398,163
ETHYLENE OXIDE ADDUCTS OF AMINO ESTERS
Joseph A. Meyers III, Springfield, Pa., and Edward G. Shay, Belle Mead, N.J., assignors to Atlantic Richfield Company, a corporation of Pennsylvania
No Drawing. Filed Dec. 4, 1964, Ser. No. 416,143
6 Claims. (Cl. 260—404)

ABSTRACT OF THE DISCLOSURE

This invention relates to organic compounds which are useful as non-ionic detergents. More particularly, this invention relates to ethylene oxide adducts of amino esters, said adducts having the formula:

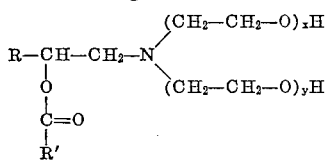

wherein R is a straight or branched chain alkyl radical having from 1 to about 18 carbon atoms, R′ is an unsubstituted hydrocarbon radical having from 1 to about 18 carbon atoms, and $x$ and $y$ are integers, the sum of $x$ and $y$ ranging from 2 to about 26.

---

The compounds hereinabove defined have excellent detergent properties and low foaming properties. The compounds are composed of a water-insoluble or hydrophobic hydrocarbon chain and a water-soluble or hydrophilic ethylene oxide chain. A particular advantage of the compounds of this invention is the flexibility with which the hydrophobic-hydrophilic balance of the compounds can be changed to suit a particular application. The hydrophobic properties of the molecule may be readily controlled by the length of the R and R′ groups, i.e., by varying the number of carbon atoms either in the R group or the R′ group, or both, and the hydrophilic properties similarly may be controlled by varying the number of ethylene oxide units attached to the nitrogen atom in the molecule. In addition mixtures of the compounds of this invention may be utilized to obtain the desired hydrophobic-hydrophilic properties required for a particular application.

The desirability of having available a class of nonionic detergent compounds whose hydrophobic-hydrophilic properties can be changed readily to suit the application for which it is intended becomes extremely important in view of the fact that non-ionic detergents are used in a wide variety of applications and each use of a non-ionic detergent requires a particular and exact balance of hydrophobic-hydrophilic properties for best performance. These changes in the hydrophobic-hydrophilic properties may be slight from use to use but they may spell the difference between best performance and mediocre performance.

When using the ethylene oxide adducts of amino esters of this invention in detergent applications it is preferred that the total carbon content of the hydrophobic portion of the molecule range from 8–30 and most preferably from 10–24.

The compounds of this invention are preferably prepared by reacting a monocarboxylic acid with a hydroxy substituted alkyl primary amine having the general formula:

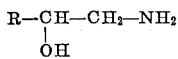

wherein R is a straight or branched chain alkyl group containing from 1 to about 18 carbon atoms to form the corresponding amino ester. The amino ester produced is then reacted with the desired amount of ethylene oxide to produce the compounds of this invention.

The hydroxy substituted alkyl primary amines which are the starting materials used to prepare the compounds of this invention are well-known in the art and include but are not limited to such compounds as 2-hydroxy-n-butyl amine, 2-hydroxy-n-nonyl amine, 2-hydroxy-tetradecyl amine, 5-methyl-4-ethyl-2-hydroxy heptylamine, and 5,5-diethyl-2-hydroxy-decyl amine. This class of compounds may be produced by reacting alpha olefins and nitrogen dioxide and successively hydrolyzing and hydrogenating the reaction product. The hydroxy substituted alkyl primary amines may also be prepared by reacting 1,2-alkylene oxides with ammonia. These methods of preparing hydroxy substituted alkyl primary amines are conventional and have been described both in patents and the technical literature.

The acids with which the amino alcohols are esterified may be any monocarboxylic acid having a carbon content ranging from 1 to 18 and includes but is not limited to such compounds as ethanoic, pentanoic, isocaproic, decanoic, oleic, stearic, benzoic acid, and the natural occurring acids such as the tallow acids. In general acids having the formula R′COOH may be employed wherein R′ is either a straight chain or branched chain alkyl group, a phenyl group, an alkylated phenyl group, an aralkyl group such as benzyl (i.e., phenyl acetic acid), an alkenyl group, and similar unsubstituted hydrocarbon groups which can form a part of an organoc acid.

As briefly outlined above, the compounds of this invention are preferably prepared by reacting hydroxy substituted alkyl primary amines with a monocarboxylic acid to form the corresponding amino ester which is then ethoxylated. The hydroxy substituted alkyl primary amines are esterified with the monocarboxylic acid using standard laboratory procedures. Equal quantities of acid and hydroxy amine, 2.5 weight percent (based on the monocarboxylic acid) of an acid catalyst and 5 times the combined weight of acid and hydroxy amine of a suitable solvent is charged to an azeotropic distillation apparatus. The distillation is started and continued until the theoretical amount of water is isolated. The product is water washed, dried and stripped of solvents. The amino ester is further purified by vacuum distillation. Ethoxylation of the amino ester is carried out using known procedures. Preferably ethylene oxide is bubbled through a reaction vessel containing nitrogen blanketed amino ester and appropriate amounts of catalyst such as potassium hydroxide. The reaction is maintained at temperatures ranging from 200° C. to 220° C. Upon complete addition of the desired amount of ethylene oxide, the reaction vessel is again blanketed with nitrogen and allowed to cool.

The following examples serve to illustrate the compounds of this invention but are in no way to be construed as limiting the invention therto.

EXAMPLE I

There were charged 20 grams of 2-hydroxy-n-octyl amine, 20 grams of octanoic acid, 200 mls. of toluene and 0.5 gram of para-toluene sulfonic acid to an azeotropic distillation apparatus. The mixture was refluxed for about 30 hours. At the end of the reaction, 3 mls. of water were isolated (theoretical 2.5 mils.). The reaction mixture was water washed and dried with anhydrous magnesium sulfate. 6.5 grams of amino ester, a white crystalline material, precipitated out of the reaction mixture and was separated by filtration. Nitrogen analysis indicated that this material contained 5.28 weight percent nitrogen vs. a theoretical of 5.17 weight percent for the amino ester. Toluene was stripped from the reaction mixture and the unreacted acid and hydroxy amine were separated from the remaining reaction mixture by vacuum distillation. 15.3 grams more of the amino ester product were recovered. Nitrogen analysis of this product indicated a nitrogen content of 5.19 weight percent vs. a theoretical of 5.17 weight percent.

A 13.5 gram sample of the amino ester prepared in the hereinabove described process and 0.5 gram of powdered potassium hydroxide were charged to an ethoxylation tube. The mixture was blanketed with nitrogen and heated to a temperature of about 180° C. Ethylene oxide was then added to the ethoxylation tube and the reaction was maintained at tempertures ranging from 200° C. to 210° C. Three gram samples of the reaction product were extracted from the reaction tube periodically as the ethylene oxide was added continuously. The samples were submitted to nitrogen analysis. The molecular weight and average number of ethylene oxide units added to the amino ester were calculated from the results of the nitrogen analysis. These data are recorded in Table I below.

TABLE I

| Sample | No. of gms. of ethylene oxide added | Analyzed percent $N_2$ | Molecular Weight | Approx. No. of ethylene oxide units |
| --- | --- | --- | --- | --- |
| 1 | 11 | 2.88 | 486 | 3 |
| 2 | 16 | 2.48 | 564 | 7 |
| 3 | 21 | 1.99 | 704 | 10 |
| 4 | 26 | 1.61 | 870 | 14 |

EXAMPLE II

There were charged 20 grams of 2-hydroxy-n-octyl amine, 29 grams of dodecanoic acid, 200 cc. of toluene and 0.5 gram of paratoluene sulfonic acid to an azeotropic distillation apparatus. The same procedures as described in Example I were followed. 27 grams of amino ester were recovered. Nitrogen analysis indicated a nitrogen content of 4.17 weight percent vs. a theoretical of 4.27 weight percent.

16.3 grams of this amino ester were ethoxylated as described in Example I. The reaction products recovered are recorded in Table II below.

TABLE II

| Sample | No. of gms. of ethylene oxide added | Analyzed percent $N_2$ | Molecular Weight | Approx. No. of ethylene oxide units |
| --- | --- | --- | --- | --- |
| 5 | 13 | 2.47 | 567 | 5 |
| 6 | 18 | 2.08 | 673 | 8 |
| 7 | 23 | 1.79 | 782 | 10 |
| 8 | 28 | 1.49 | 941 | 14 |

To evaluate the detergent properties of the compounds of the instant invention, the samples prepared in Examples I and II were tested in built formulations in a standard Launderometer apparatus. The built formulation comprised by weight 15 percent active ingredients, 50 percent sodium tripolyphosphate, 33 percent sodium sulphate and 2 percent carboxymethyl cellulose.

The procedure and method of calculating detergency values differ in minor detail from that shown in "Carbon Soil Removal,," P. T. Vitale et al., Soap and Chemical Specialties, vol. 32, No. 6, pp. 41–44 (June 1956), and are described hereafter. The Launderometer consists of a spindle mechanism rotating in a hot water thermostated bath. Mason jars of 1 pint capacity containing detergent, water, soiled cloth, and hard rubber balls for agitation are rotated on the spindle mechanism for a set time at a set rate in the hot water. The degree of cleaning is determined and the resulting numbers are the detergency values. These values are correlated with a standard anionic detergent having an arbitrarily assigned detergency value and a standard non-ionic detergent having an assigned detergency value based on the standard anionic detergent.

The detergency test are conducted in the following manner:

New cloth is cut into 4-inch wide strips across the bolt. Six strips are rolled up together and extracted with 500 cc. of acetone for 6 hours in a Soxhlet extraction apparatus. The strips are then removed and rinsed 3 times in distilled water, air dried until just barely damp, ironed until completely dry, and then placed in a 200° F. oven for 3 hours. At the end of this time, they are removed from the oven and set in a dessicator in a temperature and humidity controlled room.

The strips of cloth are soiled with the following composition:

Commercial hydrogenated vegetable oil (trademarked Crisco) _____ g __ 0.9
U.S.P. Grade mineral white oil _____ g __ 3.1
Lampblack _____ g __ 1.0
Carbon tetrachloride _____ ml __ 500

The hydrogenated vegetable oil, mineral white oil and lampblack are mixed with sufficient carbon tetrachloride to just disolve the oil and fat. The concentrated soil slurry is then passed through a small, hand-operated homogenizer and the balance of the carbon tetrachloride added. About 200 ml. of soil is placed in a nine-inch evaporating dish and a strip of the cloth is passed through this rapidly and smoothly three times. The cloth is hung to dry at room temperature for 2 hours±15 minutes and is then cut into 2-inch by 2-inch swatches and read photometrically. The photometer is calibrated against a magnesia block with a standard equal to 100.

One-pint Mason jars are washed and set in the Launderometer rack. They are filled with 6 ml. of 5 percent by weight solution of the above-mentioned built composition, 10 three-eighth inch diameter hard rubber balls, one soiled swatch, and enough 180 p.p.m. or 30 p.p.m. ("hard" or "soft" water, respectively) hardness water to make 100 ml. of solution. The final concentration of the built composition is 0.3 percent with the concentration of the active compounds of this invention being 0.045 percent by weight. The jars are capped, set on the spindle, and rotated at 40–42 r.p.m. for 20 minutes at 120° F. The jars are immediately removed, the height of the foam above the detergent solution in each jar is immediately noted (following one quick inversion of each jar), and the swatches are dried on paper and photometer readings taken.

The detergency is calculated in the following way:

$$\text{Raw Detergency} = \frac{R-S}{V-S} \times 100 = L$$

where:

$R$ = photometric percent reflectance of the washed cloth,
$S$ = photometric percent reflectance of the soiled cloth,
$V$ = photometric percent reflectance of the virgin cloth,
$R$ varies from 40–80,
$S$ usually ranges from 18 to 24,
$V$ is practically a constant at 87.

The L value is then related to a standard value by a factor to give the final detergency:

$$D = L \times \frac{S_t}{L_s}$$

where:

$S_t$ = the arbitrary detergency of the standard,
$L_s$ = the L (raw detergency) value for the standard which is always run concurrently with the material being tested.

An arbitrary detergency ($S_t$) of 70 is assigned to a commonly used commercial anionic detergent which is employed as the standard. A non-ionic commercial detergent is used as a secondary standard and is assigned a detergency of 80 based on the assigned value of 70 for the standard anionic.

The data obtained from the detergent testing is recorded in Table III below.

TABLE III

| Sample | Detergency Value at 120° F. in 150 p.p.m. hard water | Foam Height at 120° F., 1/8 in. |
|---|---|---|
| 1 | 67 | 2 |
| 2 | 74 | 3 |
| 3 | 75 | 2 |
| 4 | 74 | 3 |
| 5 | 75 | 0 |
| 6 | 75 | 1 |
| 7 | 73 | 2 |
| 8 | 80 | 2 |

It is evident from the data recorded in Table III that the compounds of this invention have excellent detergent and low foaming properties that make them particularly suitable for use in automatic laundry and dishwashing machines. It will also be evident to those skilled in the art that the compounds of this invention may be admixed with building agents other than those described hereinbefore and that their properties make them desirable for use in other applications requiring surface active properties.

We claim:

1. A compound of the formula

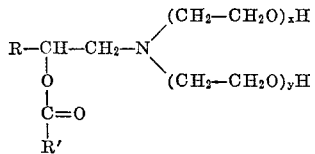

wherein R is an alkyl radical having from 6 to 18 carbon atoms, R' is an unsubstituted hydrocarbon radical having from 1 to about 18 carbon atoms, and $x$ and $y$ are integers, the sum of $x$ and $y$ ranging from 5 to 26.

2. A compound according to claim 1 wherein the sum of the carbon atoms in R and R' ranges from 13 to 27.

3. A compound according to claim 1 wherein the sum of the carbon atoms in R and R' ranges from 7 to 21.

4. A compound according to claim 1 wherein the sum of $x$ and $y$ ranges from 5 to 14.

5. A compound according to claim 1 wherein R is an alkyl radical having 6 carbon atoms and R' is an alkyl radical having 7 carbon atoms and the sum of $x$ and $y$ ranges from 7 to 14.

6. A compound according to claim 1 wherein R is an alkyl radical having 6 carbon atoms and R' is an alkyl radical having 11 carbon atoms and the sum of $x$ and $y$ ranges from 5 to 14.

References Cited

UNITED STATES PATENTS

| 2,324,488 | 7/1943 | De Groote et al. __ 260—404.5 X |
| 2,442,077 | 5/1948 | De Groote et al. __ 260—404 X |
| 2,371,429 | 3/1945 | De Groote et al. ____ 260—404 |
| 2,831,813 | 4/1958 | Matuszak et al. ____ 260—404 X |

NICHOLAS S. RIZZO, *Primary Examiner.*

F. A. MIKA, *Assistant Examiner.*